UNITED STATES PATENT OFFICE.

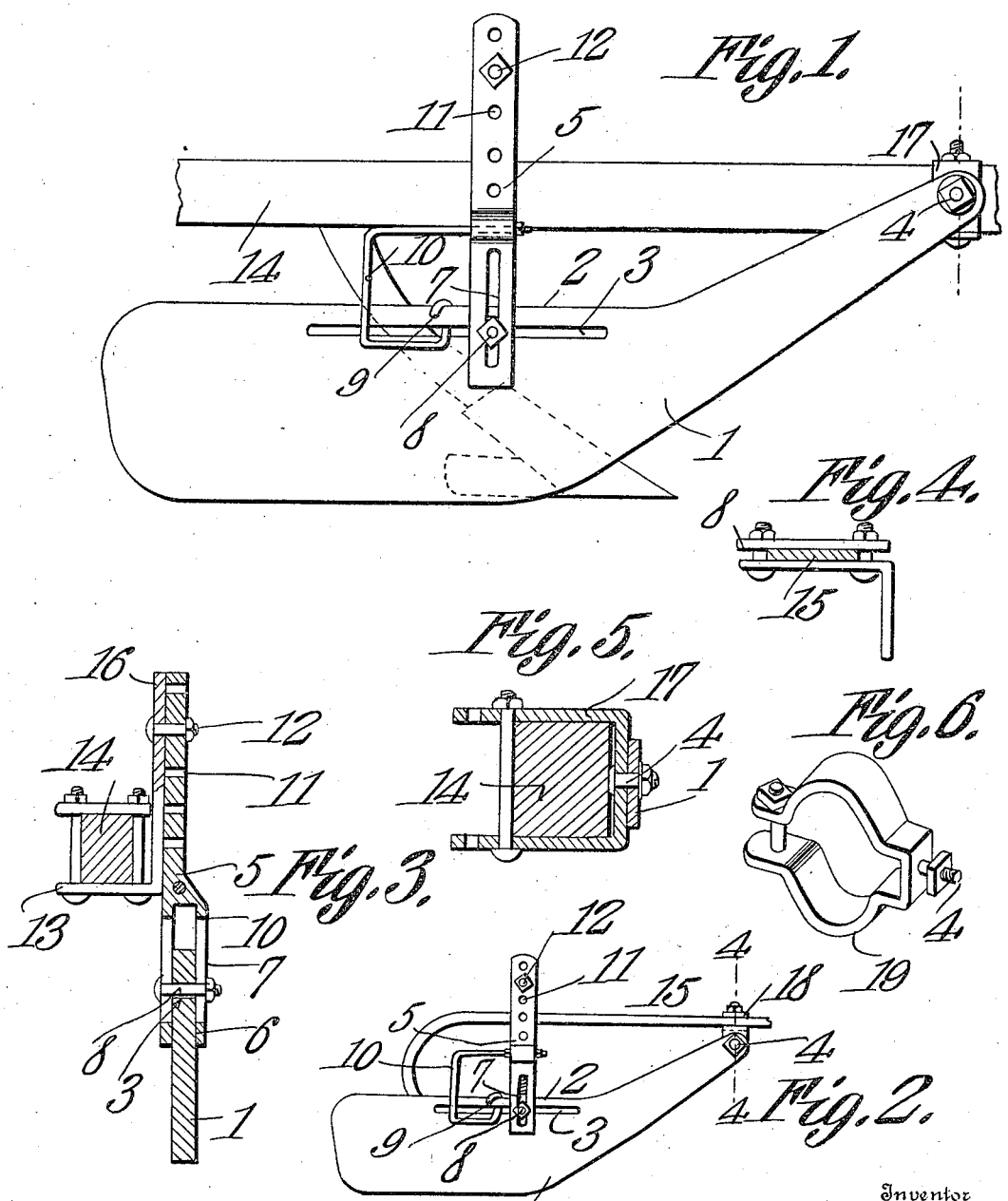

JOHN C. SKIDMORE, OF GRAPELAND, TEXAS.

PLOW-FENDER.

962,264. Specification of Letters Patent. Patented June 21, 1910.

Application filed July 8, 1909. Serial No. 506,574.

*To all whom it may concern:*

Be it known that I, JOHN C. SKIDMORE, a citizen of the United States, residing at Grapeland, in the county of Houston and State of Texas, have invented a new and useful Plow-Fender, of which the following is a specification.

This invention has relation to plow fenders, and is an improvement over the structure shown in my prior patent, granted October 22nd, 1907, No. 868,714, and the present improvement consists in the novel construction and arrangement of its parts, as hereinafter shown and described.

The object of the present invention is to provide a fender as indicated with clamping means whereby it may be adjustably attached to the beam or tooth of an agricultural implement without mutilating the beam or tooth, and, to accomplish this, the present invention includes clamping means of specific form for receiving the beam or tooth without requiring that the said beam or tooth be perforated or otherwise mutilated.

A further object of the invention is to provide a fender of peculiar configuration, and which is of such shape as to be provided with an elongated slot without materially weakening its structure.

A hanger or guide forms a component part of the fender and is provided with means for resiliently holding the same in place, and also means for adjustably connecting the same with the fender at the elongated slot thereof.

In the accompanying drawings:—Figure 1 is a side elevation, showing the fender applied to the beam of a plow. Fig. 2 is a side elevation of the same, showing the fender applied to a harrow tooth. Fig. 3 is a transverse sectional view of the fender, showing the same applied to a rectangular plow beam. Fig. 4 is a transverse sectional view through a harrow-tooth, showing a clamp member for attaching the fender to the tooth. Fig. 5 is a transverse sectional view, showing means for attaching the fender blade to a rectangular plow beam. Fig. 6 is a perspective view of a clamping means adapted to be used for securing the fender blade to a round plow-beam.

In the present invention the fender blade 1 is provided with an upper rear edge 2 approximately parallel with the lower rear edge. The fender blade 1 is provided with a longitudinally disposed elongated slot 3. The forward end of the fender blade 1 is mounted on a pivot-bolt 4, which, in turn, is supported by a clamp, which may be of any desired configuration, as will hereinafter appear.

A hanger or guide 5 is provided at its lower portion with a vertically disposed slot 6, which receives the upper portion of the fender-blade 1. The lower portion of the guide or hanger 5 is provided in its inner and outer sides with vertically disposed slots 7, through which a bolt 8 passes transversely. The said bolt 8 also passes transversely through the slot 3 in the fender-blade 1. A spring 10 is attached at its upper end to the hanger 5, and extends rearwardly, and then down and forwardly along the side of the fender 1. The said spring then extends up through the slot 3 and terminates in a hooked extremity 9, which lies over the upper edge of the fender 1. The said spring 10 is under tension with a tendency to hold the fender-blade 1 in depressed positions. The guide or hanger 5 is provided at its upper portion with a series of perforations 11, any one of which is adapted to receive a pivot bolt 12.

A clamp 13 is adapted to receive a plow-beam 14 (indicated in Figs. 1 and 3) or a harrow-tooth 15, (indicated in Figs. 2 and 4,) and is provided with an upstanding portion 16, through which the pivot bolt 12 also passes. As illustrated in Figs. 1 and 5 of the drawing, a clamp member 17 is applied to the beam 14 and supports the pivot bolt 4. As shown in Fig. 4 of the drawing, a clamp member 18, which corresponds with the clamp member 17, but which is of slightly different construction is adapted to be applied to the harrow tooth 15. As illustrated in Fig. 6 of the drawings, the clamp 19 which supports the pivot bolt 4 is provided with bowed upper and lower portions, and therefore is especially adapted to receive a round beam or support. Thus it will be seen that a variety of clamps of different patterns are provided in order that the fender may be applied to plow beams irrespective of their configuration, and the fender may also be applied to harrow or cultivator teeth. Furthermore, it will be seen that should it be desired to shift or adjust the hanger or guide longitudinally of the fender-blade 1 it is necessary only to loosen the clamp 13, when the said guide may be adjusted along the fender-blade, as indicated, without removing the nut 8 from the guide, or the slot 3 of the fender-blade.

Having described my invention, what I claim as new, and desire to secure, by Letters Patent, is:—

A fender for application to an agricultural implement comprising a pivot, a fender blade attached to the pivot for pivotal movement and having an elongated slot, a hanger carried by the implement and receiving the upper portion of the fender and having elongated slots lying transversely across the slot in the fender, a bolt passing transversely through the slots in the fender and hanger, and a spring attached to the hanger and projecting laterally and passing through the slot in the fender and having a hooked extremity which lies over the upper edge of the fender.

In testimony that I claim the foregoing as my own, I have hereto affixed my signature in the presence of two witnesses.

JOHN C. SKIDMORE.

Witnesses:
Jno. S. Morris,
J. H. Kirkwood.